United States Patent [19]

Campbell

[11] 4,408,382
[45] Oct. 11, 1983

[54] METHOD FOR REMOVING AND REPLACING SHRUNK-ON SLEEVES ON A SHAFT

[75] Inventor: Ira J. Campbell, East Bradford, Pa.

[73] Assignee: Westinghouse Electric Corp., Pittsburgh, Pa.

[21] Appl. No.: 332,563

[22] Filed: Dec. 21, 1981

[51] Int. Cl.³ .................. B23P 19/00; B23P 11/02
[52] U.S. Cl. ........................... 29/426.1; 29/426.3; 29/447
[58] Field of Search .............. 29/447, 800, 426.1, 29/426.3; 219/10.49 R

[56] References Cited

U.S. PATENT DOCUMENTS

| | | | |
|---|---|---|---|
| 1,938,995 | 12/1933 | Beynon | 29/447 |
| 3,014,266 | 12/1961 | Samuels et al. | 29/447 |
| 3,560,709 | 2/1971 | Crane et al. | 29/447 |
| 3,724,059 | 4/1973 | Celovsky | 29/800 |
| 4,024,617 | 5/1977 | McCormick | 219/10.49 R |

Primary Examiner—Ervin M. Combs
Assistant Examiner—Steven E. Nichols
Attorney, Agent, or Firm—F. J. Baehr, Jr.

[57] ABSTRACT

A method for removing and replacing shrunk-on sleeves on a shaft utilizing a fixture having upper and lower portions electrically insulated from each other and stand off insulated studs and pads which support the sleeve and induction coil within the fixture, the fixture having insulated parts which minimize circulating currents in the fixture that would result in heating of the fixture.

7 Claims, 5 Drawing Figures

METHOD FOR REMOVING AND REPLACING SHRUNK-ON SLEEVES ON A SHAFT

CROSS REFERENCE TO RELATED APPLICATIONS

An application entitled "Fixture for Removing and Replacing Shrunk-On Sleeves on a Shaft", filed the same day as this application and assigned Ser. No. 332,565 is closely related to this application and is hereby incorporated by reference into this application.

BACKGROUND OF THE INVENTION

This invention relates to shrunk-on sleeves on a shaft and more particularly to a method for removing and replacing sleeves shrunk on a shaft.

In large rotating machines, it is often desirable to install replaceable sleeves on a large shaft, because of the size of the shaft, the sleeves are not pressed on the shaft, but heated and allowed to cool on the shaft. This operation is normally referred to as heat shrinking, which produces an interference fit between the sleeve and the shaft to firmly attach the sleeve to the shaft.

After the machine has been in operation, it may be necessary to remove the sleeves as they become damaged or to remove the sleeve in order to remove other portions of the machine from the shaft. Often the sleeves are destroyed or are so badly distorted that new sleeves have to be installed.

SUMMARY OF THE INVENTION

In general, a method for removing and replacing shrunk-on sleeves on a shaft, when performed in accordance with this invention, comprises the steps of placing an induction coil so that it encircles the sleeve, attaching a fixture to the sleeve in such a manner that the sleeve and induction coil are supported by the fixture, applying alternating current to the induction coil until the temperature of the sleeve rises to a level wherein there is clearance between the sleeve and the shaft and either removing or replacing the sleeve on the shaft. If the sleeve is removed, it is insulated in order to cool slowly. If the sleeve is being installed on the shaft, once the sleeve is in place, the shaft is rotated at a low speed as the sleeve cools.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENTS

Figure 1:
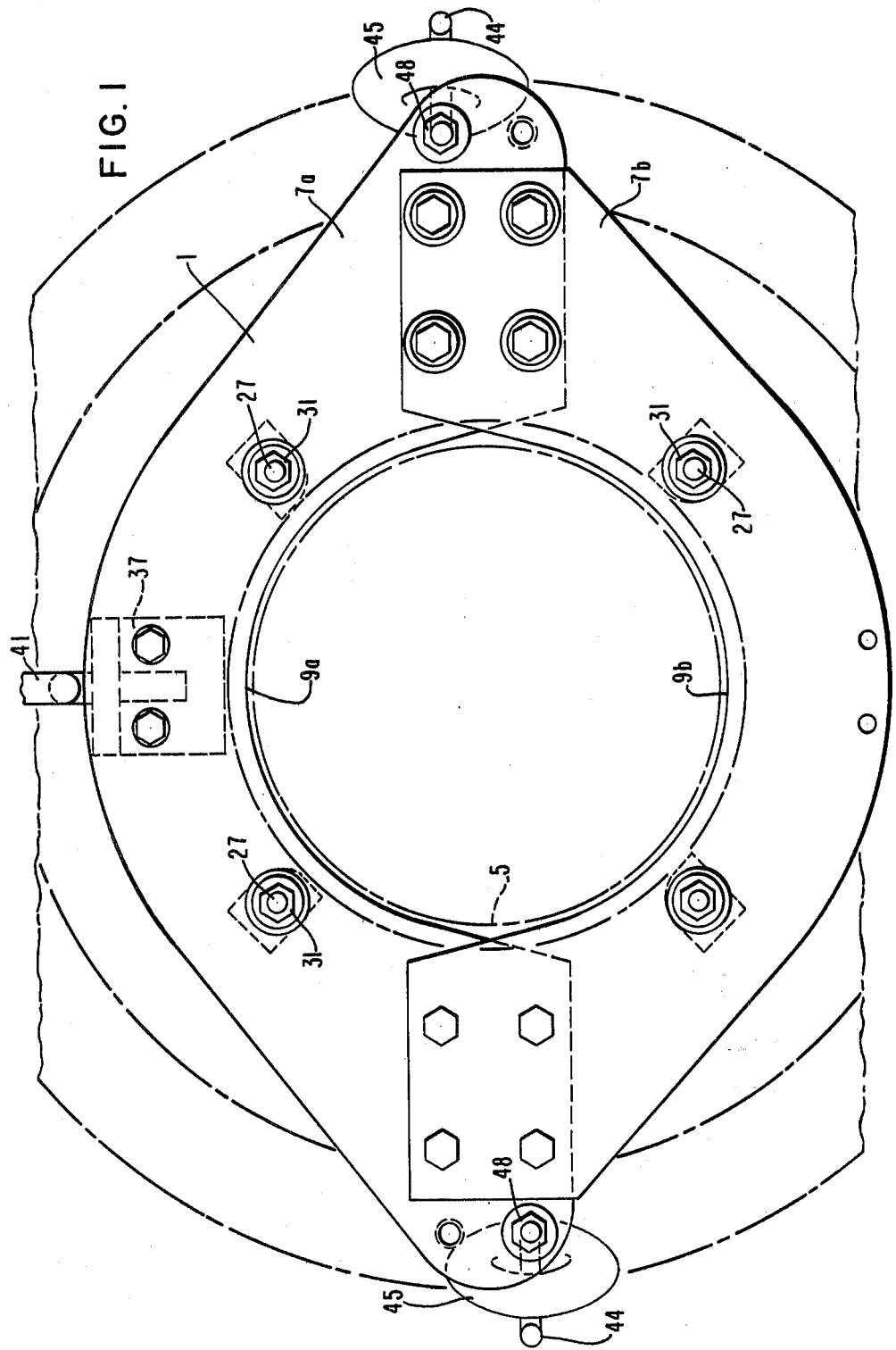
FIG. 1 is an elevational view of a fixture for removing and replacing a sleeve on the shaft showing the shaft and sleeve.
Figure 2:
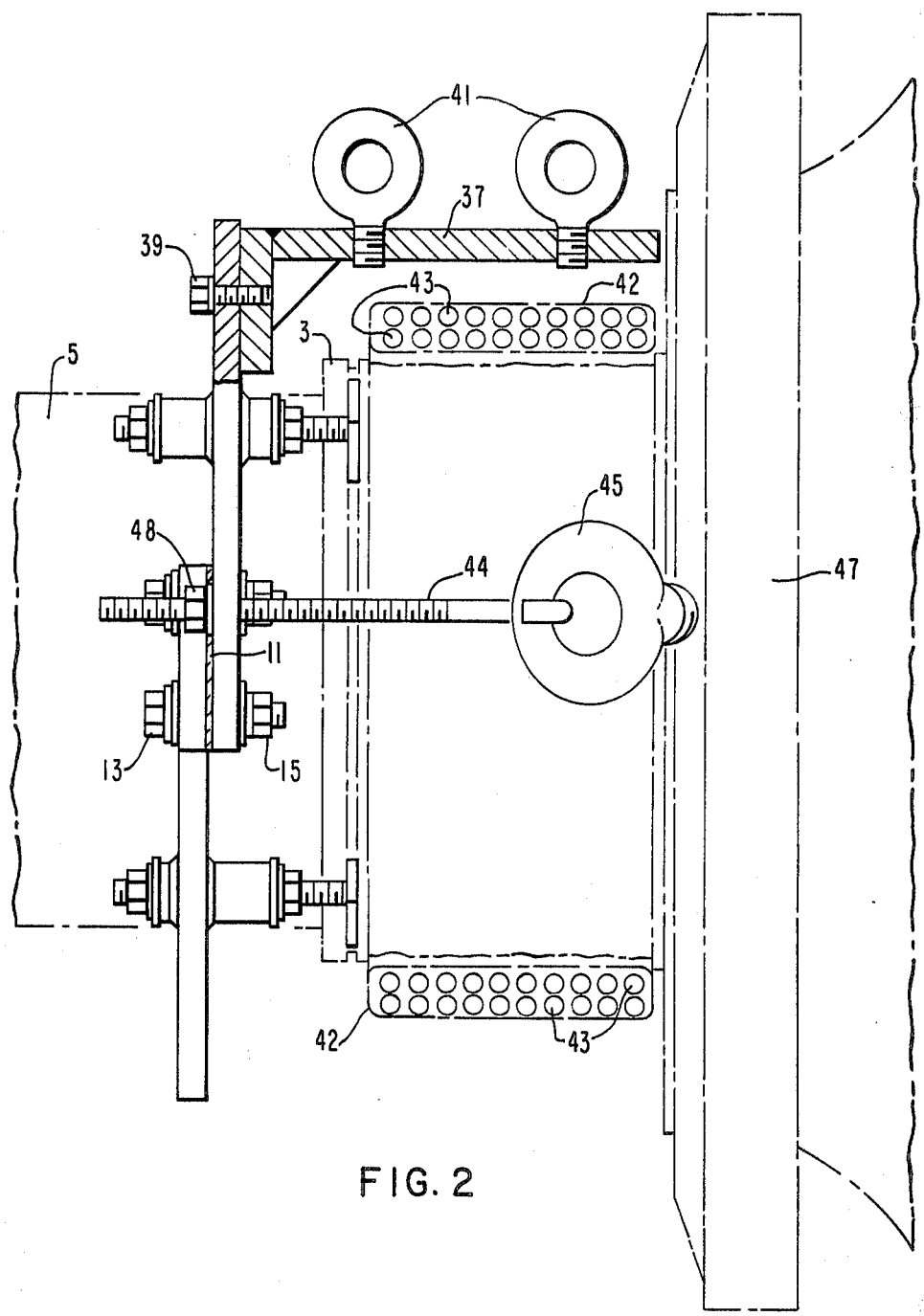
FIG. 2 is a sectional view taken on line II—II of FIG. 1.
Figure 3:
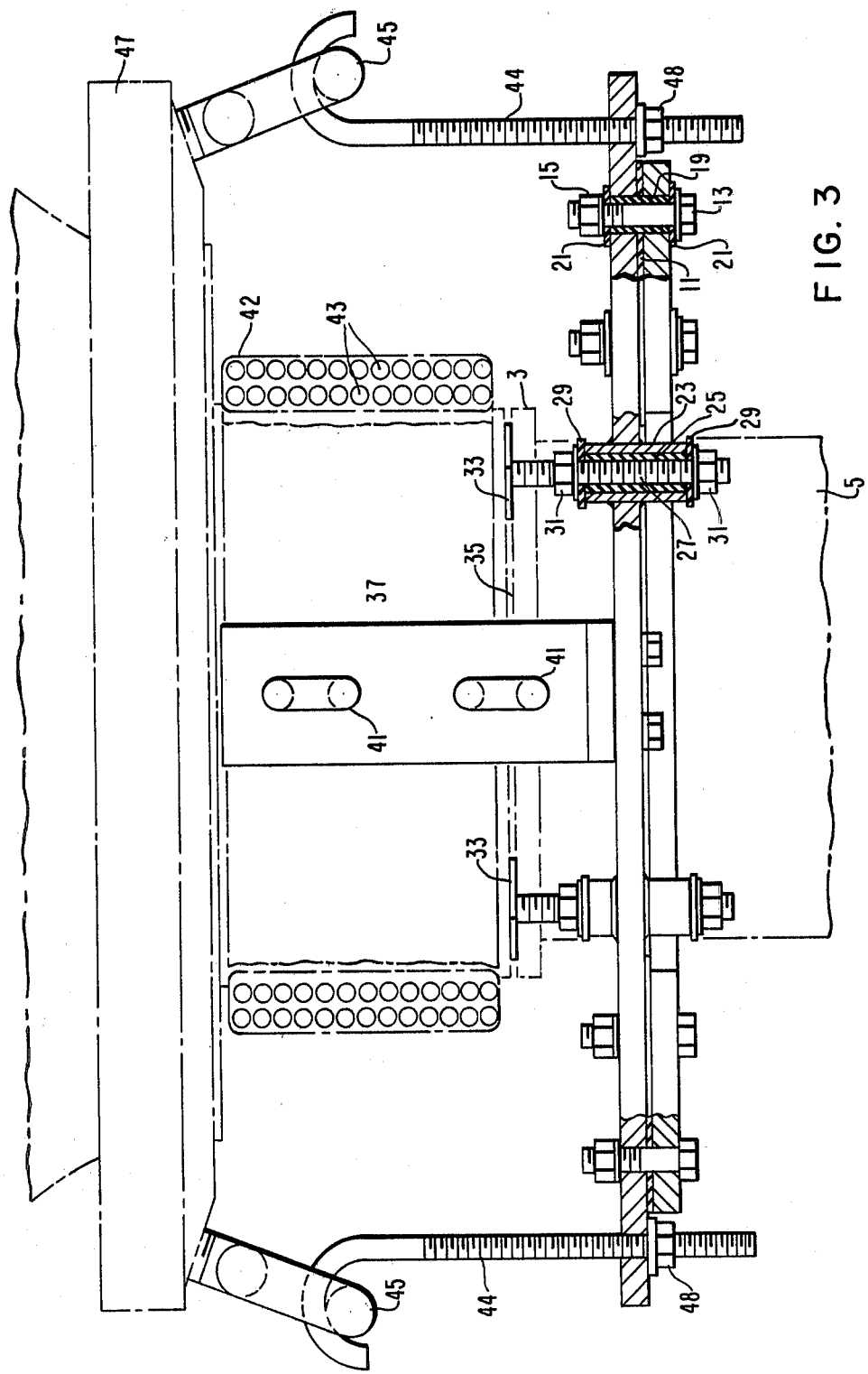
FIG. 3 is a sectional view taken on line III—III of FIG. 1.

Referring now to the drawings in detail and in particular to FIGS. 1, 2 and 3, there is shown a fixture 1 for removing and replacing sleeves 3 shrunk on a shaft 5.

The fixture 1 comprises a plurality of plate portions 7a and 7b each having a U-shaped opening 9a and 9b, respectively, which fits over the shaft 5 without contacting it. The plate portions 7a and 7b are electrically insulated or isolated from each other by a sheet of insulating material 11 and fastened to each other by bolts and nuts 13 and 15 which pass through holes 17 and the plates 7b and have insulating bushings 19 and insulating washers 21, which cooperate to electrically isolate or insulate the plates 7a and 7b from each other so they do not form a circular electrical path and yet are physically joined to form a generally circular opening which fits over the shaft 5 without contacting it.

Sleeves 23 are welded to the plates 7a and 7b. Inside the sleeves 23 are insulated bushings 25 and studs 27 pass through the insulated bushings 25 and insulated washers 29 and nuts 31 position the studs 27 within the sleeves 23. On one end of the studs 27 is a pad 35 which is affixed thereto by welding or other means. The pads 33 fit a groove 36 in the sleeve and cooperate with the studs 27 to support the sleeve 3 within the fixture 1.

A bracket 37 is fastened to the plate portion 7a by machine screws 39 or other means and is disposed to extend over the studs 27 and sleeve 3. Eyelets 41 are fastened to the bracket 37 and are disposed so that the fixture 1 and sleeve 3 can be supported thereby on a crane or hoist (not shown).

A fluid-cooled induction coil 42 formed from tubular conductors 43 encircles the sleeve 3 and with the sleeve 3 is supported by the fixture 1.

J bolts 44 extend from the plate 7a and attached to eyelets 45 disposed on a balance ring 46 disposed on the shaft 5. Nuts 47 secure the J bolts 44 to fasten the fixture 1 and sleeve 3 at a particular location on the shaft when the sleeve is being installed on the shaft.

Figure 4:
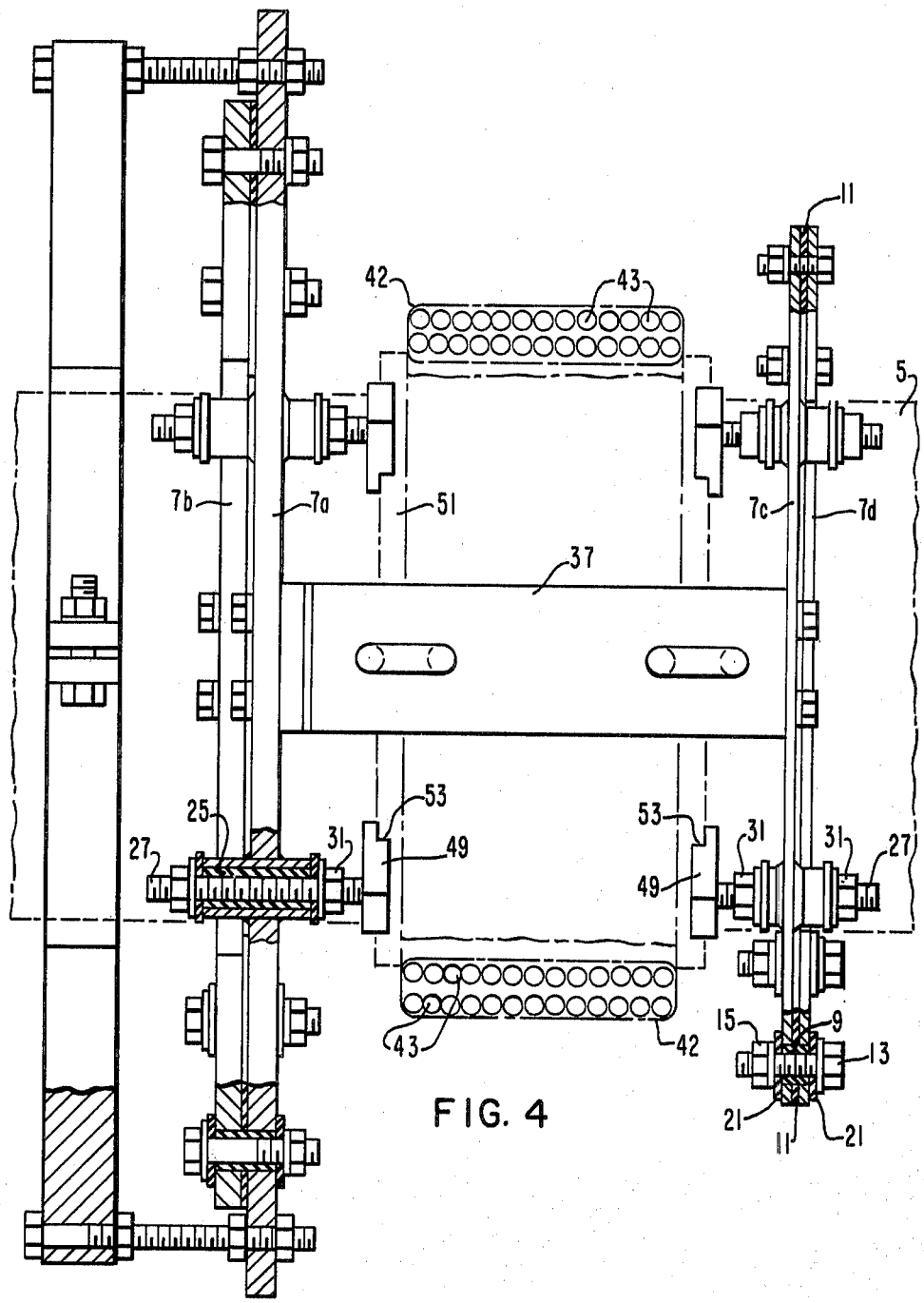
FIG. 4 is an elevational view partially in section of an alternative embodiment.
Figure 5:
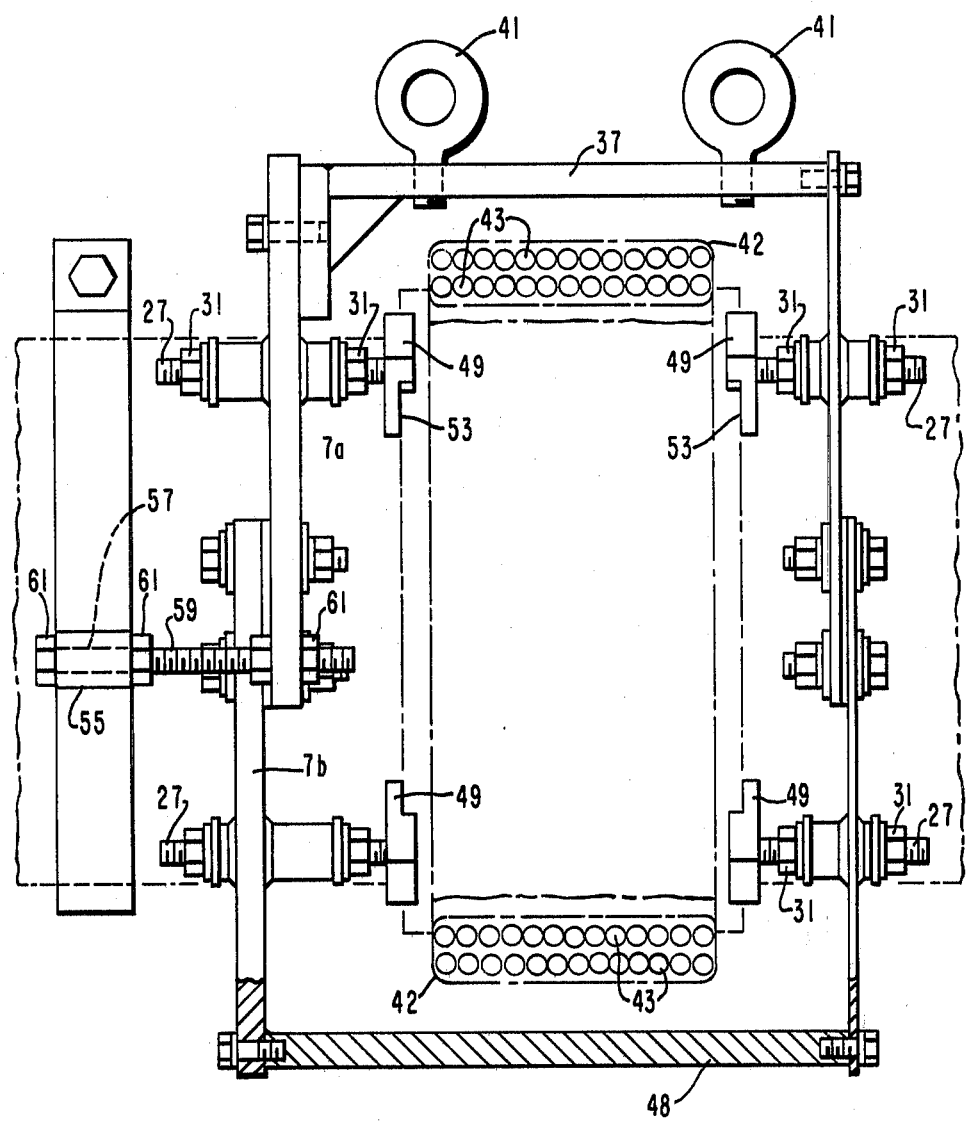
FIG. 5 is a sectional view taken on line V—V of FIG. 4.

As shown in FIGS. 4 and 5, a second set of plates 7c and 7d each have U-shaped openings 9c and 9d and are separated by an insulating sheet 11 and fastened together by bolts and nuts 13 and 15 passing through holes 17 and the plates 7c and 7d and have insulating bushing 19 and insulating washers 21 which cooperate with the insulating sheet 11 to electrically isolate or insulate the plates 7c and 7d so they do not form a conductive loop and yet are physically joined to form a generally round opening from the U-shaped openings 9c and 9d. The plate portion 7d is fastened to the bracket 37 and a support 48 connects the plates 7b and 7d.

Sleeves 23 disposed in the plate portions 7c and 7d have insulating bushings 25, studs 27, insulating washers 29 and nuts 31 associated therewith in order to position a pad 49 disposed on one end of the studs 27 to support a sleeve 51 within the fixture 1a. The pads 49 have a step 53 which engages the sleeve 51 and holds the sleeve 51 in induction coil 42 within the fixture 1a. A band 53 is clamped on the shaft and has arms 55 which have holes 57 for receiving studs 59 which are utilized with nuts 61 to position the fixture 1a and sleeve 51 at a predetermined location on the shaft 5 in order to locate the sleeve 51 at a particular location on the shaft 5 as the sleeve 51 cools.

The method for removing a sleeve 3 or 51 from a shaft utilizing the fixture 1 or 1a comprises the steps of:

matchmarking the sleeve 3 or 51 and the shaft 5 so that the sleeve 3 or 51 may be replaced in the exact orientation and location on the shaft 5;

placing the induction coil 42 over the sleeve 3 or 51;

attaching the fixture 1 or 1a to the sleeve 3 or 53, respectively, utilizing the studs 27 and pads 33 or 49 to support the sleeve 3 or 51 within the fixture 1 or 1a;

heating the sleeve 3 or 51 to a sufficient temperature to produce a clearance between the sleeve 3 or 51 and the shaft 5, generally under 800° F., by applying alternating current to the induction coil 42; monitoring the temperature of the sleeve utilizing thermocouples or other temperature monitoring devices to ensure that the temperature does not exceed 800° F.;

attaching a crane or hoist to the fixture 1 or 1a to remove the fixture and sleeve 3 or 51 when there is clearance between the sleeve 3 or 51 and the shaft 5;

insulating the removed sleeve 3 or 51 so that it cools slowly and evenly in order to prevent distortion of the sleeve 3 or 51.

The method for installing the sleeve 3 or 51 on the shaft 5 comprises the steps of placing an induction heater 42 over the sleeve 5 attaching the fixture 1 or 1a to the sleeve 3 or 51, respectively, so that the sleeve and coil are supported by the fixture;

attaching a hoist or crane to the fixture;

heating the sleeve by applying alternating current to the induction coil 42 until the temperature of the sleeve reaches a predetermined temperature;

monitoring the temperature of the sleeve utilizing thermocouples or other monitoring means and preventing the temperature for exceeding 800° F.;

sliding the sleeve 3 or 51 over the shaft 5 to the desired position;

aligning the matchmarks on the sleeve and the shaft;

clamping the sleeve in place utilizing the J bolts or clamping band;

detaching the crane or hoist;

rotating the shaft at a low speed, approximately three revolutions per minute, until the sleeve has cooled;

if the sleeve is against a shoulder, applying cooling air to the ends of the sleeve adjacent the shoulder to minimize the amount that the sleeve pulls away from the shoulder;

removing the fixture from the sleeve and removing the induction coil from the sleeve.

The fixtures and method for removing and replacing shrunk-on sleeve on a shaft hereinbefore described advantageously allows for the removal of sleeves without cooling the shaft and due to the lower temperature at which the sleeve is removed, distortion and damage to the sleeve is prevented making the sleeve reuseable and by rotating the shaft when installing the sleeves, shaft distortion due to locked-in stresses are reduced to an extent that post-sleeve installation stress relieving of the shaft is not required. Sleeves can be reused thus eliminating the use of new sleeves which necessitate machining in order to provide the required running tolerances.

What is claimed is:

1. A method for removing a sleeve shrunk on a shaft comprising the steps of:

placing an induction coil so that it encircles the sleeve;

attaching a fixture to the sleeve in such a manner that the sleeve and induction coil can be supported by the fixture;

applying alternating current to the induction coil until the temperature of the sleeve rises to a level wherein there is clearance between the sleeve and the shaft;

removing the fixture induction coil and sleeve from the shaft; and placing insulation around the removed sleeve so that it cools slowly and evenly to minimize distortion of the sleeve.

2. The method as set forth in claim 1 and further comprising the step of matchmarking the shaft and sleeve.

3. The method as set forth in claim 1 and further comprising the step of monitoring the temperature of the sleeve to ensure that it does not exceed 800° F.

4. A method of installing a shrunk-on sleeve on a shaft comprising the steps of placing an induction coil so that it encircles the sleeve;

attaching a fixture to the sleeve in such a manner that the sleeve and induction coil are supported by the fixture;

applying alternating current to the induction coil until the temperature of the sleeve reaches a predetermined value;

sliding the heated sleeve over the shaft;

affixing the location of the sleeve on the shaft; and rotating the shaft at a low speed as the sleeve cools.

5. The method as set forth in claim 4 and further comprising the step of blowing air on one end of the sleeve to cool the end more rapidly to set the location of that end of the sleeve.

6. The method as set forth in claim 4 and further comprising the step of monitoring the temperature of the sleeve as it is heated by the induction coil.

7. The method as set forth in claim 4 wherein the step of monitoring the temperature includes monitoring the temperature to ensure that the temperature does not exceed 800° F.

* * * * *